United States Patent [19]

Yamamori et al.

[11] Patent Number: 5,480,553
[45] Date of Patent: Jan. 2, 1996

[54] HOLLOW FIBER MEMBRANE MODULE

[75] Inventors: Hisayoshi Yamamori, Nagoya; Akira Hoshide, Tokyo; Masumi Kobayashi, Nagoya, all of Japan

[73] Assignee: Mitsubishi Rayon Co., Ltd., Tokyo, Japan

[21] Appl. No.: 129,078

[22] PCT Filed: Feb. 12, 1993

[86] PCT No.: PCT/JP93/00176

§ 371 Date: Oct. 7, 1993

§ 102(e) Date: Oct. 7, 1993

[87] PCT Pub. No.: WO93/15827

PCT Pub. Date: Aug. 19, 1993

[30] Foreign Application Priority Data

Feb. 12, 1992 [JP] Japan ................... 4-025419
Jun. 19, 1992 [JP] Japan ................... 4-161322

[51] Int. Cl.⁶ .................... B01D 63/02; B01D 65/08
[52] U.S. Cl. ............... 210/650; 139/383 R; 210/321.79; 210/500.23; 210/791; 210/796; 210/797
[58] Field of Search ............. 210/321.79, 321.8, 210/321.88, 321.89, 232, 500.23, 650, 653, 654, 791, 793, 796, 797; 139/383 R, 383 B; 422/48

[56] References Cited

U.S. PATENT DOCUMENTS

| | | | |
|---|---|---|---|
| 3,616,928 | 11/1971 | Rosenblatt. | |
| 3,713,540 | 1/1973 | Davidson et al. | 210/791 |
| 3,976,576 | 8/1976 | Jacobsen et al. | 210/321.8 |
| 3,993,816 | 11/1976 | Baudet et al. | 210/321.8 |
| 4,075,100 | 2/1978 | Furuta et al. | 210/321.8 |
| 4,140,637 | 2/1979 | Walter | 210/321.79 |
| 4,448,691 | 5/1984 | Davis | 210/321.89 |
| 4,940,542 | 7/1990 | Simizu et al. | 210/321.89 |
| 4,980,056 | 12/1990 | Norton | 210/137 |
| 5,032,269 | 7/1991 | Wollbeck et al. | 210/321.8 |
| 5,141,031 | 8/1992 | Baurmeister | 210/321.79 |
| 5,297,591 | 3/1994 | Baurmeister | 210/321.79 |

FOREIGN PATENT DOCUMENTS

| | | |
|---|---|---|
| 1094462 | 1/1981 | Canada. |
| 0024536 | 3/1981 | European Pat. Off.. |
| 0254100 | 1/1988 | European Pat. Off.. |
| 0442147 | 8/1991 | European Pat. Off.. |
| 0450068 | 10/1991 | European Pat. Off.. |
| 56-2803 | 1/1981 | Japan. |
| 58-9601 | 2/1983 | Japan. |
| 60-261509 | 12/1985 | Japan. |
| 62-250908 | 10/1987 | Japan. |
| 1-92203 | 6/1989 | Japan. |
| 4-40221 | 2/1992 | Japan. |
| WO81/02705 | 10/1981 | WIPO. |
| WO91/16967 | 11/1991 | WIPO. |

*Primary Examiner*—John Kim
*Attorney, Agent, or Firm*—Oblon, Spivak, McClelland, Maier & Neustadt

[57] ABSTRACT

A hollow fiber membrane module comprising (a) hollow fibers, (b) a fastening member for fixing the ends of the hollow fibers while leaving them open, and (c) a structural member for enclosing and supporting the fastening member, the hollow fiber membrane module being useful in the filtration of water by suction from the surface to the inside of the hollow fibers with intermittent or continuous cleaning of the membrane surfaces of the hollow fibers, characterized in that the hollow fibers comprise a textile fabric containing hollow fibers as the weft and the cross-section of the fastening member perpendicular to the hollow fibers is shaped like an elongated rectangle. In this module, the hollow fibers rarely cohere together into a mass, and the membrane surfaces of the hollow fibers can be efficiently cleaned concurrently with the filtration, so that the loss of the filtering function is minimized.

3 Claims, 8 Drawing Sheets

5,480,553

HOLLOW FIBER MEMBRANE MODULE

TECHNICAL FIELD

This invention relates to a hollow fiber membrane module and a filtration method using this module. More particularly, it relates to a hollow fiber membrane module suitable for the filtration of highly polluted liquids (in particular, liquids polluted with organic matter), and a filtration method using such a module.

BACKGROUND ART

Conventionally, hollow fiber membrane modules have been widely used in the field of so-called precision filtration applications including, for example, the preparation of sterile water, drinking water and high-purity water and the purification of air. In recent years, various attempts are being made to use hollow fiber membrane modules in highly polluted liquid treatment applications including, for example, secondary and tertiary treatments in sewage disposal plants, solid-liquid separation in night soil clarification tanks, separation of suspended solids (SS) from industrial waste water, direct filtration of river water in water purification plants, filtration of tap water for industrial use, and filtration of pool water.

However, most hollow fiber membrane modules used in these applications are of a cylindrical type which comprises a bundle of hollow fibers arranged in a circle or concentric circles and has conventionally been used in the field of precision filtration applications. Moreover, even where improvements are made in such hollow fiber membrane modules, they often comprise a mere modification of the packing density or packing form of hollow fibers.

When such a prior art hollow fiber membrane module is used for the treatment of highly polluted liquid (for example, SS≧50 ppm, TOC≧100 ppm), the hollow fibers cohere (or stick) together into a mass through the medium of the deposits (such as organic matter) accumulated on the membrane surfaces of the hollow fibers during use. As a result, the effective membrane surface area of the hollow fibers within the module is reduced to cause a rapid decrease in filtering flow rate. This phenomenon tends to occur especially in the hollow fibers located in the central part of cylindrical modules, and becomes more conspicuous with large-sized ones.

Although such a hollow fiber membrane module is periodically subjected to membrane surface cleaning or back washing, it is not easy to restore the function of the module whose hollow fibers have once cohered together into a mass, thus indicating a reduction in cleaning efficiency.

DISCLOSURE OF THE INVENTION

It is an object of the present invention to provide a hollow fiber membrane module which, even when used for the filtration of highly polluted liquid, the hollow fibers contained in the module rarely cohere together into a mass, and the membrane surfaces of the hollow fibers can be efficiently cleaned concurrently with the filtration, so that the loss of the filtering function is minimized.

It is another object of the present invention to provide a hollow fiber membrane module which can be efficiently produced on an industrial scale.

According to one aspect of the present invention, there is provided a hollow fiber membrane module comprising (a) hollow fibers, (b) a fastening member for fixing the ends of the hollow fibers while leaving them open, and (c) a structural member for enclosing and supporting the fastening member, said hollow fiber membrane module being useful in the filtration of water by suction from the surface to the inside of the hollow fibers with intermittent or continuous cleaning of the membrane surfaces of the hollow fibers, characterized in that the hollow fibers comprise a textile fabric containing hollow fibers as the weft and the cross-section of the fastening member perpendicular to the hollow fibers is shaped like an elongated rectangle.

According to another aspect of the present invention, there is provided a filtration method which comprises (A) immersing a hollow fiber membrane module in water to be treated, the hollow fiber membrane module comprising (a) hollow fibers, (b) a fastening member for fixing the ends of the hollow fibers while leaving them open, and (c) a structural member for enclosing and supporting the fastening member, the hollow fibers comprising a textile fabric containing hollow fibers as the weft, the cross-section of the fastening member perpendicular to the hollow fibers being shaped like an elongated rectangle; and (B) filtering the water by suction from the surface to the inside of the hollow fibers with intermittent or continuous cleaning of the membrane surfaces of the hollow fibers.

BEST MODE FOR CARRYING OUT THE INVENTION

Figure 1:
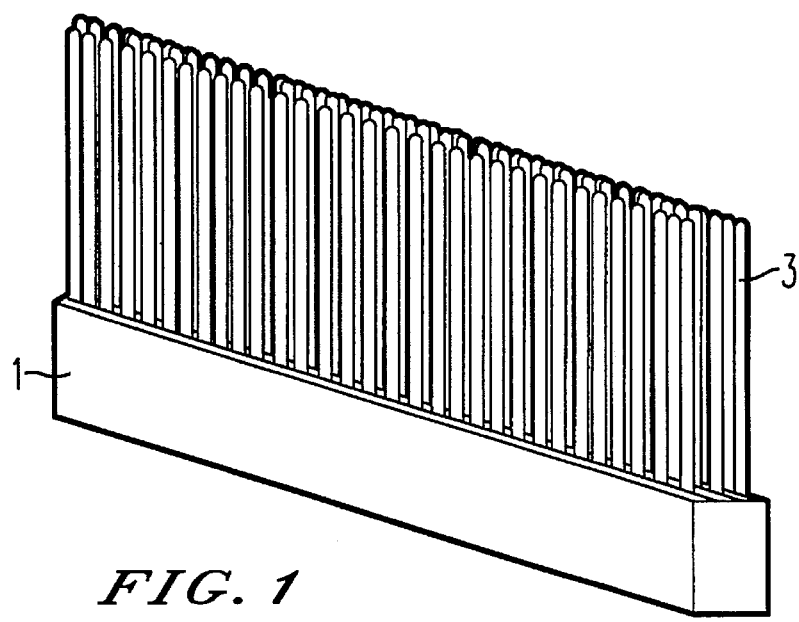
FIG. 1 is a perspective view illustrating one embodiment of the hollow fiber membrane module of the present invention.
Figure 2:
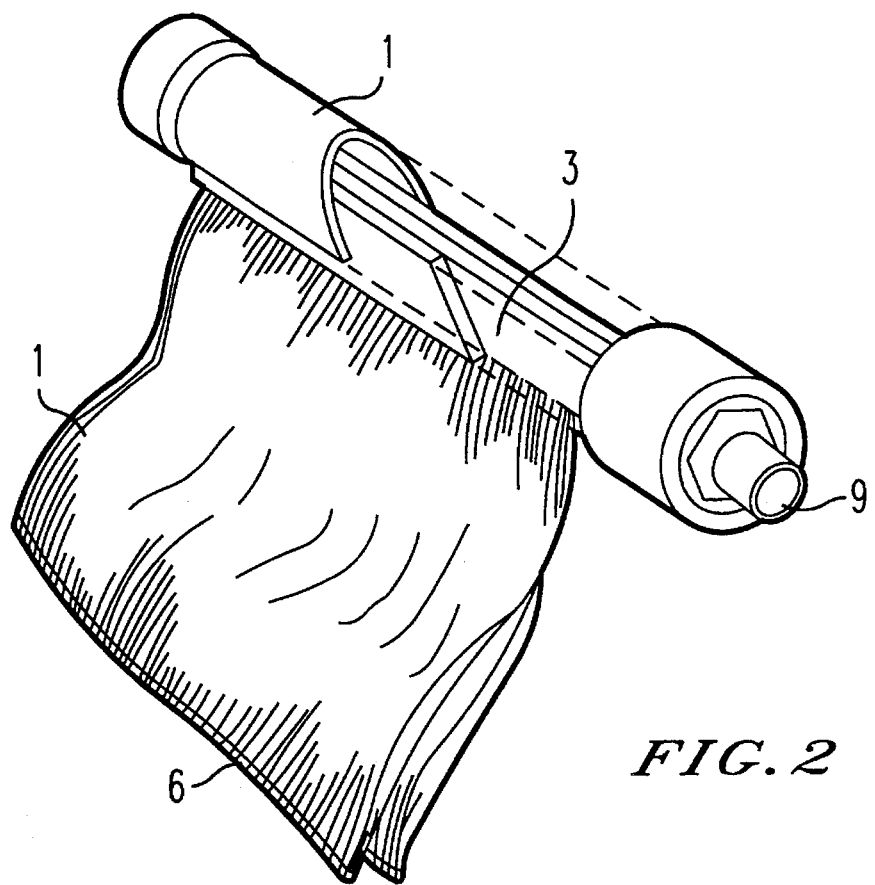
FIG. 2 is a partially cutaway perspective view illustrating another embodiment of the hollow fiber membrane module of the present invention.

As illustrated in FIGS. 1 and 2, the hollow fiber membrane module of the present invention is basically composed of a structural member 1, a fastening member 2 and hollow fibers 3. In addition to them, various auxiliary components such as a dispersing means 4 may be attached thereto.

The structural member 1 functions as a member for supporting the entire hollow fiber membrane module and has an aperture shaped like an elongated rectangle. It may be formed of any material that has adequate mechanical strength and durability, and useful examples thereof include polycarbonate, polysulfones, polypropylene, acrylic resins, ABS resins and modified PPE resins. If the structural member 1 is to be incinerated after use, it is preferable to use as its material a hydrocarbon resin which can be burned out without producing toxic gases.

The aperture of the structural member 1, in which a fastening member 2 is filled and secured together with the hollow fibers, should be such that the cross-section of the fastening member 2 perpendicular to the hollow fibers is shaped like an elongated rectangle. The short dimension of this rectangle is preferably 30 mm or less and more preferably 15 mm or less. Thus, by spreading the hollow fibers in the form of a flat sheet, it is possible to prevent the whole bundle of hollow fibers from cohering together into a rodlike mass and thereby showing a rapid reduction in the effective membrane surface area of the hollow fibers. Even if the hollow fibers cohere together, the resulting mass of the hollow fibers has a small thickness and the hollow fibers are arranged in a sheet-like manner, the consolidated hollow fibers can be easily separated according to the aforementioned techniques. No particular limitation is placed on the long dimension of the rectangle. However, If it is too small, the number of hollow fibers which can be contained within the hollow fiber membrane module is undesirably decreased, and if it is too large, difficulties are encountered in fabricating the hollow fiber membrane module. The long dimension of the rectangle is usually 100 to 2000 mm.

The fastening member 2, which is filled and secured in the aperture of the structural member 1, serves to bundle and fix the ends of a large number of U-shaped hollow fibers 3 while leaving them open, and functions as a liquid-tight partitioning member for separating the water to be treated from the treated water. The fastening member 2 is usually formed by curing any of various liquid resins such as epoxy resins, unsaturated polyester resins and polyurethanes.

As the hollow fibers 3, there can be used various types of hollow fibers. Useful examples thereof include hollow fibers formed of various materials based on cellulose, polyolefins, polyvinyl alcohol, PMMA, polysulfones and the like. However, hollow fibers formed of high-strength and high-elongation materials such as polyethylene and polypropylene are preferred because they can be easily made into knitted fabrics. No particular limitation is placed on the pore size, porosity, membrane thickness and outer diameter of the hollow fibers used, so long as they serve as a filtering membrane. However, in consideration of the objects to be removed, the membrane area per unit volume, and the strength of the hollow fibers, it is preferable to use hollow fibers having a pore size of 0.01–1 µm, a porosity of 20–90%, a membrane thickness of 5–300 µm and an outer diameter of 20–2,000 µm. Where it is desired to remove bacteria, it is essential that the pore size be not greater than 0.2 µm. Where it is desired to remove organic matter and viruses, ultrafiltration membranes having a fractionating molecular weight ranging from several tens of thousands to several hundreds of thousands may be used.

As regards the surface properties of the hollow fibers, they are preferably formed of a so-called permanently hydrophilized membrane having hydrophilic groups or the like in the surfaces thereof. In the case of hollow fibers having hydrophobic surfaces, the hydrophobic interaction occurring between the organic matter present in the water to be treated and the membrane surfaces of the hollow fibers causes the organic matter to be adsorbed to the membrane surfaces, leading to a blockage of the membrane surfaces and a shortening of the filtering life. Moreover, when the hollow fibers have been clogged as a result of adsorption, it is generally difficult to restore their filtering function by cleaning the membrane surfaces. The use of permanently hydrophilized hollow fibers suppresses the hydrophobic interaction between organic matter and the membrane surfaces of the hollow fibers and thereby minimize the adsorption of organic matter.

When hollow fibers formed of a hydrophobic membrane are used after being temporarily (or non-permanently) hydrophilized with ethanol or a surfactant, their membrane surfaces may be dried as a result of cleaning by air bubbling or the like. Since the membrane surfaces of the hydrophobic hollow fibers consist of the hydrophobic substrate itself, they lose hydrophilicity after being once dried, and require the above-described hydrophilizing treatment in order to hydrophilize them again. Accordingly, where filtration combined with air bubbling cleaning (air scrubbing cleaning)is carried out for a long period of time, the portions incapable of participating in filtration increase gradually, resulting in reduced filtering efficiency.

In order to prepare permanently hydrophilized hollow fibers, there may employed any of various well-known processes. For example, they may be prepared by forming hollow fibers of a hydrophilic polymer such as polyvinyl alcohol, or by hydrophilizing the surfaces of hollow fibers formed of a hydrophobic polymer. Where hydrophobic hollow fibers are hydrophilized by depositing a hydrophilic polymer on the membrane surfaces thereof, examples of useful hydrophilic polymers include a saponification product of an ethylene-vinyl acetate copolymer, and polyvinyl pyrrolidone.

Another process for hydrophilizing the membrane surfaces of hydrophobic hollow fibers comprises polymerizing a hydrophilic monomer on the membrane surfaces. The monomers useful for this purpose include, for example, diacetone acrylamide. Still another process comprises spinning a blend of a hydrophobic polymer (such as a polyolefin) and a hydrophilic polymer to form hollow fibers. The hydrophilic polymers useful for this purpose are the same as enumerated above.

In order to insert the hollow fibers 3 into the elongated rectangular aperture of the structural member 1, it is preferable to use a single piece, or a stack of several pieces, of knitted fabric containing hollow fibers as the weft. In the case of prior art cylindrical modules, no difficulty has been encountered in inserting a bundle of reeled hollow fibers into a cylindrical structural member. However, it is difficult to insert reeled hollow fibers into the elongated rectangular aperture of the structural member 1. Nevertheless, a knitted fabric can be easily inserted thereinto. In constructing a stack of several pieces of knitted fabric, two or more knitted hollow fiber fabrics having different properties may be used. For example, where a hollow fiber membrane module is fabricated by using a stack sandwiched between outer layers of knitted fabric formed of hydrophobic hollow fibers, these outer layers can be utilized as a means for supplying air bubbles in back washing.

Alternatively, a piece of knitted hollow fiber fabric folded narrowly in a zigzag manner (or disposed in a serpentine form) may be used in place of the stack of several pieces of knitted fabric. According to this configuration, it is possible to prevent the hollow fibers from being unevenly distributed in the fastening member, even when the packing density of the hollow fibers is relatively low.

In the hollow fiber membrane module of the present invention, the U-shaped hollow fibers are preferably configured as an assembly of sub-bundles of hollow fibers. As used herein, the term "sub-bundle" means a group of hollow fibers meeting the requirement described below. That is, the opposite ends (or the portions forming the roots of the U-shape) of the hollow fibers contained in one sub-bundle are fixed in the fastening member so that they are adjacent to each other (preferably in an area of 1 cm$^2$). Thus, the hollow fibers belonging to the same sub-bundle can be easily bundled (or arranged in order by pulling), but hollow fibers belonging to different sub-bundles cannot be easily bundled as a result of interference by hollow fibers lying in the neighborhood. More specifically, where only a bundle of hollow fibers wound on a single reel is inserted into the structural member and fixed thereto, all of the hollow fibers contained in the module are considered to belong to the same sub-bundle. On the other hand, where a knitted hollow fiber fabric using a yarn composed of 10 hollow fabric as the weft is inserted into the structural member and fixed thereto, all hollow fibers forming each weft yarn constitutes a sub-bundle and the number of hollow fibers contained in each sub-bundle is 10.

Accordingly, where the U-shaped hollow fibers are configured as an assembly of sub-bundles of hollow fibers, the hollow fibers belonging to each sub-bundle can be easily bundled and thereby separated from those belonging to other sub-bundles. Thus, in using the hollow fiber membrane module, the hollow fibers can be forcibly fastened in a uniformly dispersed state with ease. The number of hollow fibers contained in each sub-bundle is preferably 100 or less and more preferably 50 or less, though it depends on the thickness of the hollow fibers. Basically, it is ideal for purposes of uniformly dispersed fastening that each sub-bundle is composed of a single hollow fiber. However, the number of hollow fibers contained in each sub-bundle may be suitably chosen according to the intended use.

Figure 3:
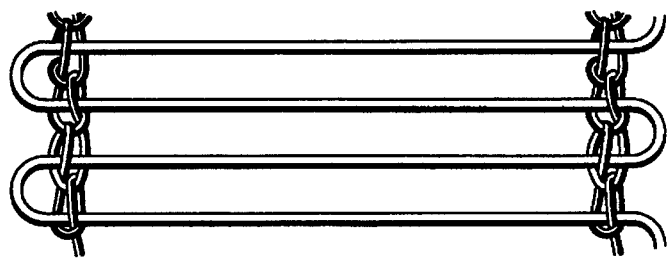
FIG. 3 is a plan view illustrating a knitted hollow fiber fabric for use in the fabrication of hollow fiber membrane modules in accordance with the present invention.

Although no particular limitation is placed on the method for fabricating the hollow fiber membrane module of the present invention, it is preferably fabricated according to the following procedure. First of all, a knitted fabric as illustrated in FIG. 3 is made by using hollow fibers as the weft and an ordinary yarn as the warp. (Alternatively, a woven fabric is made when the weft yarn is composed of a single hollow fiber instead of a plurality of hollow fibers.) The ordinary yarn used as the warp may comprise any of the yarns used as the warp in common knitted fabrics and woven fabrics. However, it is preferable that the warp yarn is not so hard as to damage the hollow fibers during manufacture and handling of the knitted fabric. In practice, multifilament yarns, spun yarns and finished yarns are preferably used. No particular limitation is placed on the material thereof, and any of commonly used materials such as polyesters, nylon and vinylon can be used. Methods of making knitted fabrics are disclosed, for example, in Japanese Patent Laid-open Nos. 57965/'87 and 266258/'89. The resulting knitted fabric in sheet form is cut in suitable lengths, and a single piece or a stack of several pieces. As used herein, the term "stack" also comprehends a sheet of knitted fabric folded to a suitable length instead of being cut. Although the number of layers in the stacked or folded knitted fabric may vary according to the thickness of the knitted fabric (i.e., the thickness of the hollow fibers and the number of hollow fibers constituting each weft yarn), it is usually about 5 or less. The number of layers is preferably chosen so as to meet the above-described requirement concerning the short dimension of the rectangular cross-section of the fastening member. One end of this stacked knitted fabric is inserted into the elongated rectangular aperture of the structural member. Then, the portions contained in the structural member is fixed by filling a liquid resin into the aperture thereof and curing it (this process is hereinafter referred to as "potting"). Thereafter, the cured resin is cut so as to expose the open ends of the hollow fibers. Alternatively, as described previously, a piece of knitted fabric containing hollow fibers as the weft may be folded narrowly in a zigzag manner, and one end of this folded knitted fabric may be inserted into the aperture of the structural member.

Although the warp yarns of the knitted fabric are generally present only at the opposite ends of the hollow fibers constituting the weft, they may be present in the intermediate part of the weft at regular intervals. In the case of modules having no warp yarn in the intermediate part of the weft, uniform dispersion of the hollow fibers may not be maintained when the hollow fibers are cleaned by a water current or by air bubbling. In modules having warp yarns in the intermediate part of the weft, uniform dispersion of the hollow fibers can be effectively maintained under such conditions.

In the fabrication of hollow fiber membrane modules, a method utilizing centrifugal force is generally employed to fill a liquid resin between the hollow fibers without leaving any space. However, where the hollow fibers are to be potted within a structural member having an elongated rectangular aperture, a large-sized bucket or other tool having a special shape is required for purposes of centrifugal potting. Accordingly, potting should preferably be carried out by a Vibration method which is scarcely influenced by the size or shape of the structural member. Specifically, a knitted hollow fiber fabric is inserted into the structural member, which is then filled with a liquid resin. It is to be understood that, in the same manner as in the fabrication of conventional hollow fiber membrane modules, the ends of the hollow fiber bundle should be sealed in order to prevent the liquid resin from penetrating into the bore of the hollow fibers. For this purpose, liquid resins having a viscosity of about 1,000 to 2,500 centipoises are most preferred. While the liquid resin still has fluidity, its uniform filling is achieved by applying mechanical vibration to the structural member containing the hollow fiber bundle and the liquid resin. Although the vibration frequency is suitably of the order of 500 to 12,000 cycles per second, vibrations in the ultrasonic frequency range can also be applied. The details of potting by the vibration method are disclosed in Japanese Patent Laid-open No. 114515/'91. This potting process permits the liquid resin to be uniformly filled into the structural member, thus preventing the separation between the hollow fibers and the cured resin (fastening member) and the leakage of filtered fluid in the fastening member. The cutting of the end surface (or the formation of open ends of the hollow fibers) after curing the liquid resin may be carried out according to the general method for fabricating hollow fiber membrane modules.

In the filtration of highly polluted liquid by use of hollow fiber membrane modules, large amounts of SS and organic matter deposit on the membrane surfaces. For this reason, it is necessary to clean the membrane surfaces by separating the deposits therefrom with the aid of a water current, air, vibration, ultrasonic waves and the like. Unless the membrane surfaces are cleaned, the organic matter accumulated on the membrane surfaces causes a blockage of the membrane surfaces, resulting in a shortening of the filtering life. Specific cleaning methods include, for example, the so-called cross flow filtration method in which water is made to flow in parallel with the membrane surfaces, the method of producing a water current in the module containing tank by means of a pump or motor, the bubbling method utilizing an upward flow of air, the method of vibrating the module itself, and the method of vibrating the water to be treated by means of ultrasonic waves. The hollow fiber membrane module of the present invention has a form suitable for carrying out these membrane surface cleaning methods concurrently with filtration. Accordingly, in using the hollow fiber membrane module of the present invention, cleaning the membrane surfaces of the hollow fibers is carried out concurrently with filtration. However, this cleaning may be carried out continuously or intermittently, depending on the rate at which the blockage of the membrane surfaces proceeds.

In using the hollow fiber membrane module of the present invention for purposes of filtration, there may be employed the so-called pressure filtration method in which the module is placed in a sealed vessel and the water to be treated is pressurized to cause water to pass though the hollow fiber membrane. However, it is more suitable to use the module according to the suction filtration method in which the module is immersed in an activated sludge tank or sedimentation tank and the inside of the hollow fibers is evacuated to recover the treated water having passed through the hollow fiber membrane.

Generally, a blockage of the membrane surfaces during filtration is monitored by a rise in transmembrane pressure. In a module showing a rise in transmembrane pressure, a large amount of clogging matter is accumulated on the membrane surfaces. Accordingly, it is difficult in many cases to restore its filtering function by cleaning operation or the like. In the suction filtration method, the measurement of transmembrane pressure for monitoring any blockage of the membrane surfaces is carried out by measuring the suction pressure with a vacuum gauge installed on the suction side. No particular limitation is placed on the suction pressure, which may range from 0 cmHg to vacuum (76 cmHg). However, in order to prevent the formation of gas bubbles in the suction line, the suction pressure is preferably 40 cmHg or below. Moreover, in order to prevent clogging matter from penetrating into the pores of the membrane, the suction pressure is preferably 10 cmHg or below and more preferably 5 cmHg or below.

In particular, employment of the so-called intermittent suction operating method in which the suction is interrupted at regular intervals makes it possible to effectively prevent the deposits on the membrane surfaces to penetrate into the pores of the membrane and thereby reduce the frequency of the treatment required for restoring the function of the hollow fiber membrane module. The optimum range of suction intervals in the intermittent suction cannot be clearly defined because it depends on the degree of pollution of the water to be treated. By way of example, where activated sludge containing water characterized by an MLSS content of about 5,000 ppm, each suction cycle may preferably consists of a suction period of 1 to 30 minutes and a pause of 10 seconds to 15 minutes.

Moreover, where the suction filtration method is employed, it is easy to circulate the water to be treated in the tank during filtration or clean the membrane surfaces by air bubbling. In particular, air bubbling can exhibit a more powerful cleaning effect when combined with the above-described intermittent suction operating method which can effectively prevent the deposits on the membrane surfaces to penetrate into the pores of the membrane.

In order to enhance the cleaning effect on the membrane surfaces of the hollow fibers, the direction of flow of the water to be treated by suction filtration should preferably be substantially perpendicular to the direction of alignment of the hollow fibers.

Figure 4:
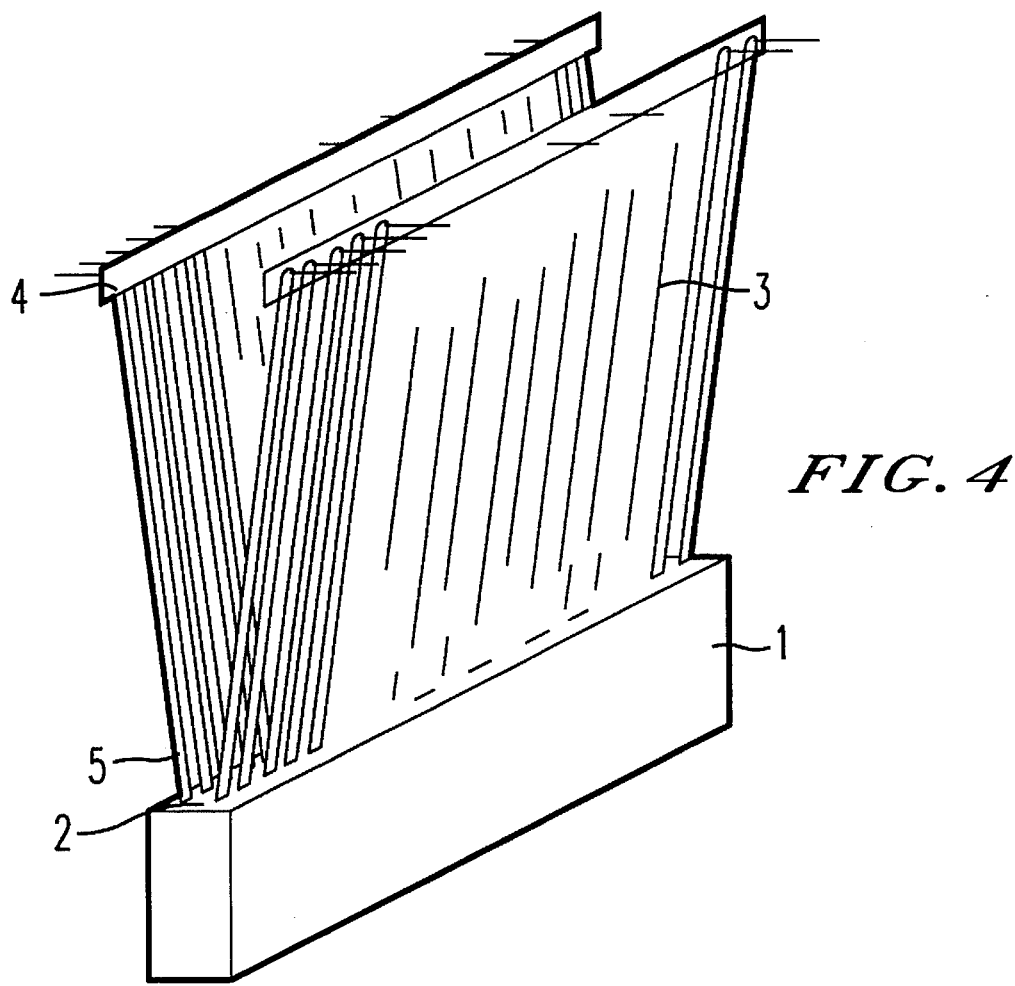
FIG. 4 is a perspective view illustrating one exemplary method for using the hollow fiber membrane module of the present invention.
Figure 5:
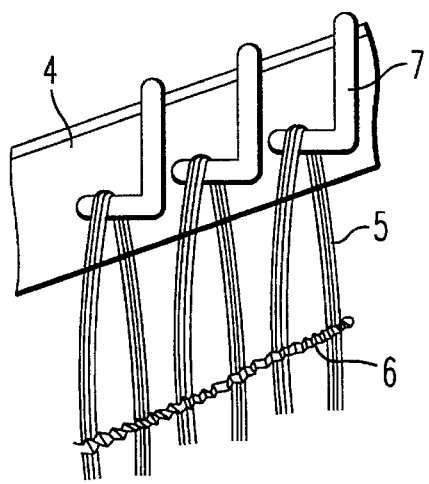
FIG. 5 is an enlarged fragmentary view illustrating an instance of the manner in which the hollow fiber membrane module of the present invention is used.

One preferred method for using the hollow fiber membrane module of the present invention is illustrated in FIG. 4. According to this method, filtration is carried out while the hollow fibers are held in a dispersed state with the aid of a dispersing means 4 for fastening the tops of the U-shaped sub-bundles 5 of hollow fibers separately. For this purpose, it is convenient and preferable to engage the tops of the U-shaped sub-bundles with the dispersing means 5 as illustrated in FIG. 5, by utilizing a warp yarn 6 for tentatively fastening the hollow fibers in the formation of the knitted fabric. Of course, the warp yarn 6 for tentatively fastening the hollow fibers in the formation of the knitted fabric may be removed from the hollow fiber membrane module. The dispersing means 4 may be installed separately from the hollow fiber membrane module or formed integrally with the hollow fiber membrane module. Moreover, the dispersing means 4 is not limited to the hooks 7 illustrated in FIG. 5, but may also comprise a rodlike member provided with partitioning strips or a member having attached thereto a series of strings for tying the tops of the U-shaped sub-bundles. By using such a dispersing means, the highly dispersed state of the hollow fibers can be maintained for a longer period of time even when the hollow fiber membrane module of the present invention is used for the filtration of highly polluted liquid.

According to another preferred method for using the hollow fiber membrane module of the present invention, a plurality of modules are mounted on a rotator and rotationally moved during filtration. In one embodiment, the housings of the modules are attached to the rotator in such a way that they extend horizontally and radially from the radiator and the hollow fibers hang down from the respective housings. In another embodiment, the modules are attached to the vertically positioned rotator in such a way that the hollow fibers extend horizontally and radially from the respective modules.

The hollow fiber membrane modules of the present invention are particularly suitable for use in the filtration of highly polluted liquid. Specific fields of application include the filtration of river water, the filtration of tap water for industrial use, the solid-liquid separation of sewage and waste water, the treatment of waste water (for example, in combined water clarification tanks), and the like.

In using the hollow fiber membrane module of the present invention, various methods for restoring its filtering function, other than the above-described membrane surface cleaning methods, can be employed concurrently with the filtration. For example, back washing can conveniently be carried out in the same manner as for conventional modules. Moreover, the method of physically cleaning the membrane surfaces with the aid of sponge balls or the like and the ultrasonic cleaning method can also be efficiently carried out owing to the unique physical form of the module.

Figure 6:
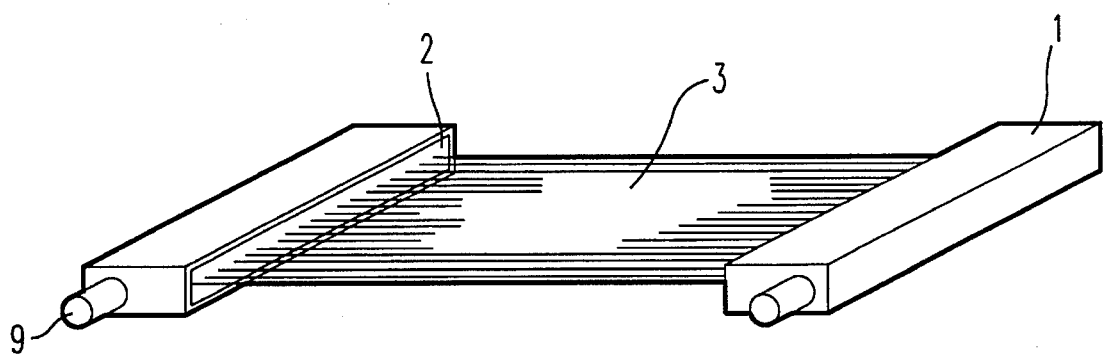
FIGS. 6–9 are perspective views illustrating further embodiments of the hollow fiber membrane module of the present invention.

Although the present invention has been described in connection with the hollow fiber membrane module in which, as illustrated in FIG. 1, the fastening member is disposed at one side (or one end) of the knitted hollow fiber fabric and the hollow fibers are bent into a U-shape, a hollow fiber membrane module in which, as illustrated in FIG. 6, two fastening members and two structural members are disposed at two opposite sides of the knitted hollow fiber fabric can be used in all the same manner. In FIG. 6, numeral 9 designates an outlet for treated water.

Figure 7:
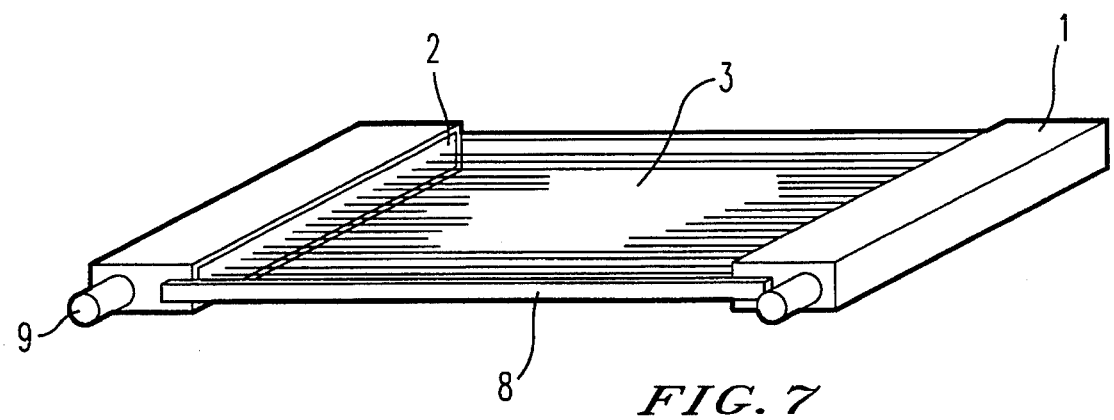

In the embodiment having two fastening members disposed at two opposite sides of a knitted hollow fiber fabric, the warp may be completely removed from the knitted hollow fiber fabric. More specifically, in the course of fabrication of this hollow fiber membrane module, a knitted hollow fiber fabric is used. However, the warp may be embedded in the fastening members when two opposite sides of the fabric are potted, or the warp may be cut off together with the discarded parts of the fastening members when the open ends of the hollow fibers are formed. (Accordingly, the large number of parallel hollow fibers constituting the filling are disposed in a sheet-like form.) This embodiment has the additional advantage that the handling of the hollow fiber membrane module can be facilitated by holding a constant positional relationship between the two structural members with the aid of a supporting means such as supporting bars. In addition to the supporting bars illustrated in FIG. 7, various other embodiments of such supporting means can be conceived as described below.

Figure 8:
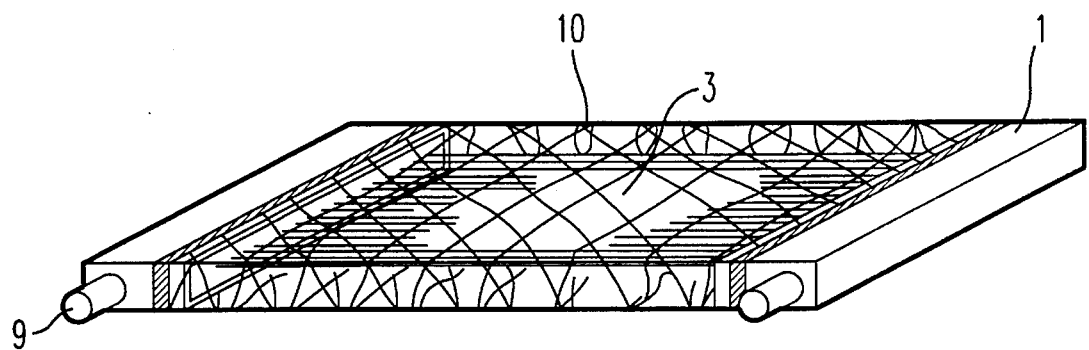
Figure 9:
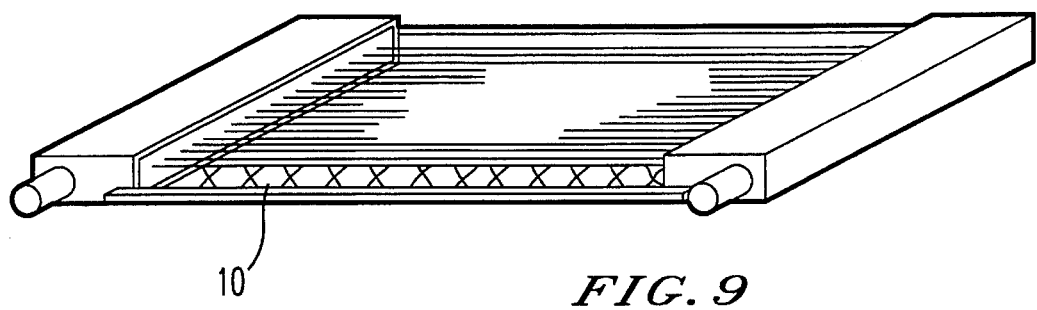
Figure 10:
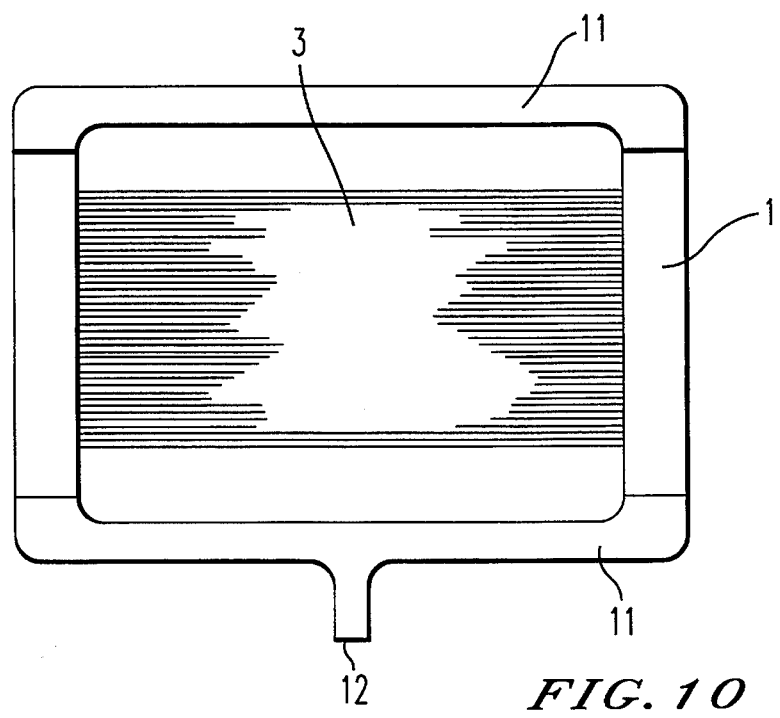
FIG. 10 is a plan view illustrating a still further embodiment of the hollow fiber membrane module of the present invention.

FIG. 8 illustrates a hollow fiber membrane module constructed so that the distance between the two structural members is fixed by using wire netting alone in place of the supporting bars. In this embodiment, wire netting 10 is disposed on all sides of the hollow fibers 3. Alternatively, as illustrated in FIG. 9, wire netting 10 may be disposed only above or below the hollow fibers 3. Use of the wire netting 10 not only offers the advantage of facilitating the handling of the hollow fiber membrane module, but also performs a protective function for preventing the hollow fibers from being damaged, or a spacer function for preventing the hollow fibers from cohering together when two or more modules are used in stacked arrangement. Similar effects can also be produced by using one or more perforated plates in place of the wire netting. Furthermore, FIG. 10 is a plan view illustrating an embodiment in which the distance between the two structural members is fixed by using water ducts 11 in place of the supporting bars. In this embodiment, a water outlet 12 is provided in one of the water ducts 11, but two water outlets may be provided on both sides.

Figure 11:
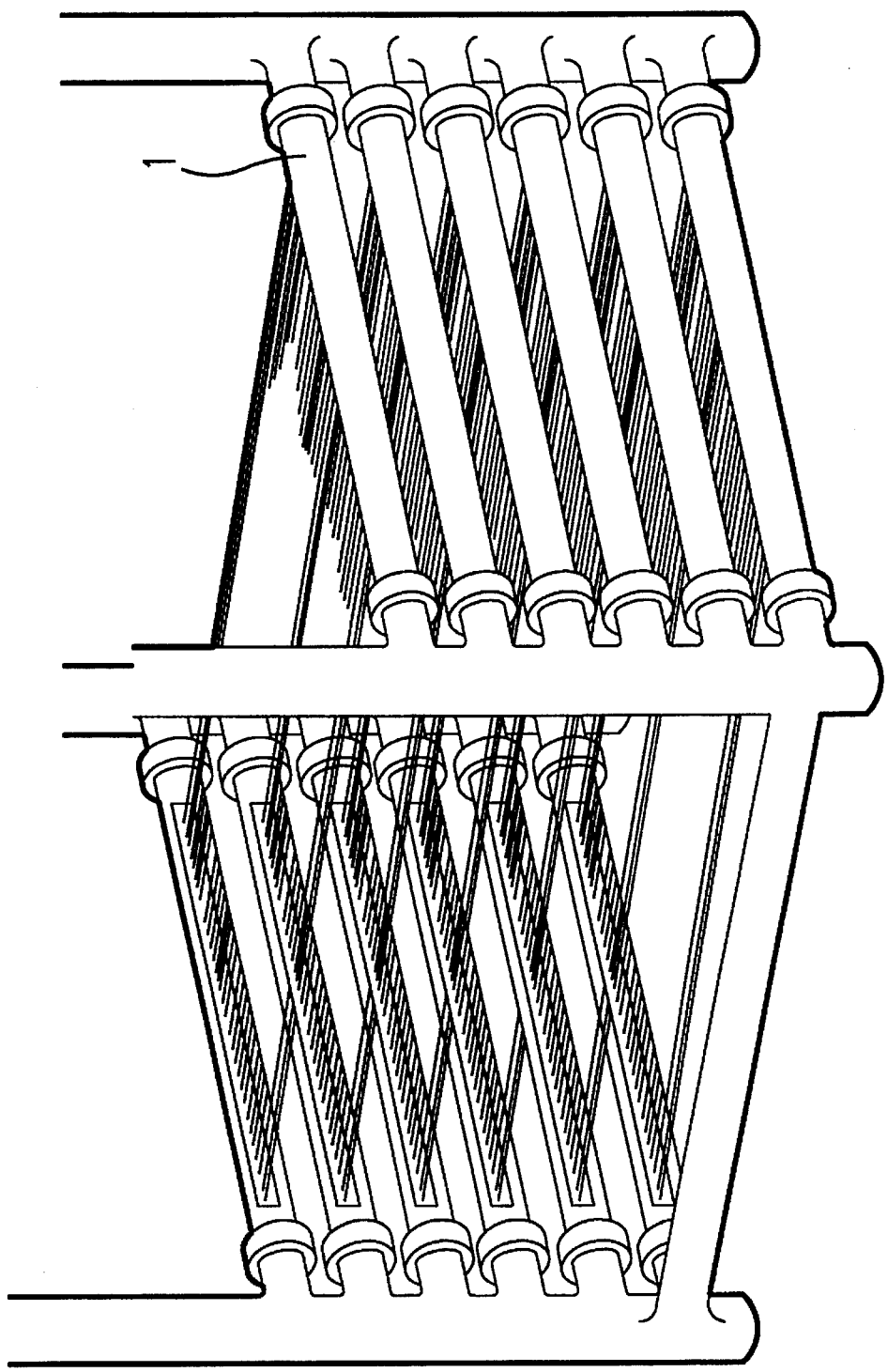
FIG. 11 is a perspective view illustrating the preferred manner in which the hollow fiber membrane module of the present invention is used.

As illustrated in FIG. 11, a plurality of hollow fiber membrane modules may be used in stacked arrangement. FIG. 11 illustrates only one manner of stacking, and any other manner of stacking may be employed. For example, more effective cleaning of the membrane surfaces can be achieved by stacking the hollow fiber membrane modules not horizontally but slantingly, or by stacking the hollow fiber membrane modules so as to alter the direction of alignment of the hollow fibers. Where the hollow fiber membrane modules used in stacked arrangement are cleaned by air bubbling, more of the air tends to escape to the outside of the module as the position of the module becomes higher, so that the contact between the membrane surfaces and the air decreases. If desired, this air-escaping phenomenon can be avoided by enclosing each module with an outer frame and stacking the modules so that no space is left between adjacent outer frames.

As regards the degree of relaxation of the hollow fibers fastened in a dispersed state, they should preferably be tensioned to such an extent that at least the effect of the dispersed fastening is exhibited even in the middle part of the module. That is, if the hollow fibers are relaxed too much, the middle portions thereof are made free in spite of their fixed ends, so that the effect of the fastening is diminished by half.

Figure 12:
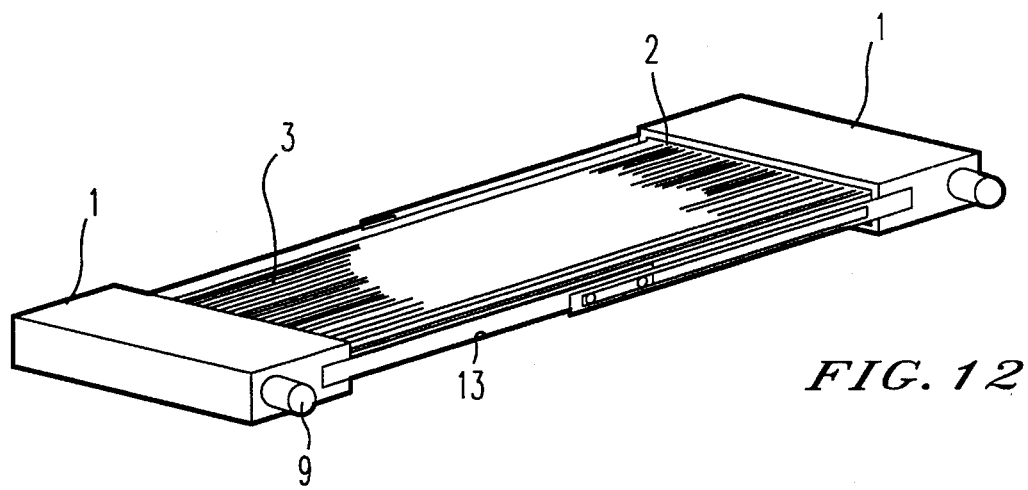
FIG. 12 is a perspective view illustrating a still further embodiment of the hollow fiber membrane module of the present invention.
Figure 13:
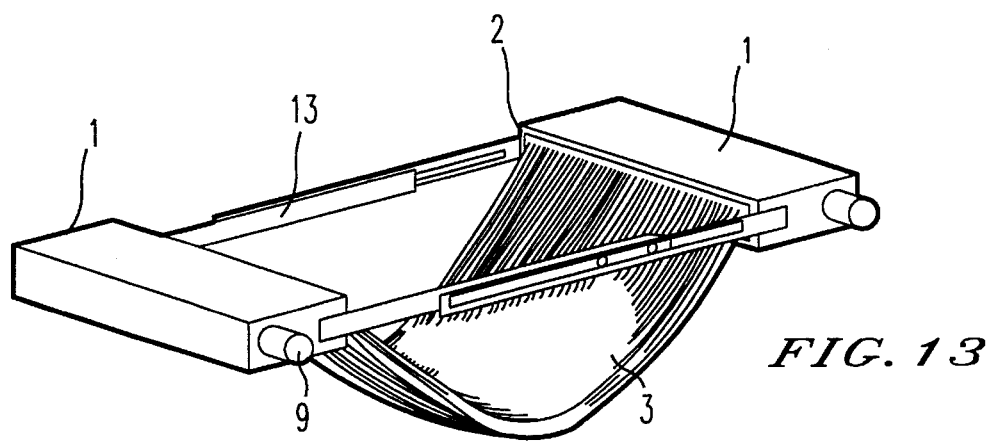
FIG. 13 is a perspective view illustrating the hollow fiber membrane module of FIG. 12 in which the distance between the structural members is reduced.

In a further embodiment, the hollow fiber membrane module may be provided with movable supporting bars which can be expanded or contracted to alter the distance between the structural members as illustrated in FIGS. 12 and 13. If the degree of relaxation of the hollow fibers is increased at the time of membrane surface cleaning, more effective cleaning can be achieved by enhancing the vibrations of the hollow fibers by air bubbling.

The length of the supporting bars between the fastening members may be such that the hollow fibers are not tensioned to an undue extent. Usually, the length is maximized within such limits. However, when the membrane surfaces are cleaned by vibrating the module itself, it may be desirable to reduce the distance between the fastening members and thereby relax the hollow fibers, especially in cases where the hollow fibers have cohered together into a mass. Thus, the length of the supporting bars may be suitably chosen according to the need.

The present invention is further illustrated by the following examples.

EXAMPLE 1

A stack of four pieces of knitted fabric made by using a yarn composed of 8 porous polyethylene hollow fibers (commercially available from Mitsubishi Rayon Co., Ltd. under the trade name of EHF270T; having an inner diameter of 270 μm and an outer diameter of 380 μm) as the weft was inserted into a housing having a 10 mm×30 mm aperture. Then, the portions placed in the aperture were fixed with a urethane resin according to the vibration potting method to fabricate a hollow fiber membrane module of the construction illustrated in FIG. 1. Each hollow fiber forming a loop had a length of 760 mm and a total effective filtering area of the module was 5 $m^2$.

Figure 14:
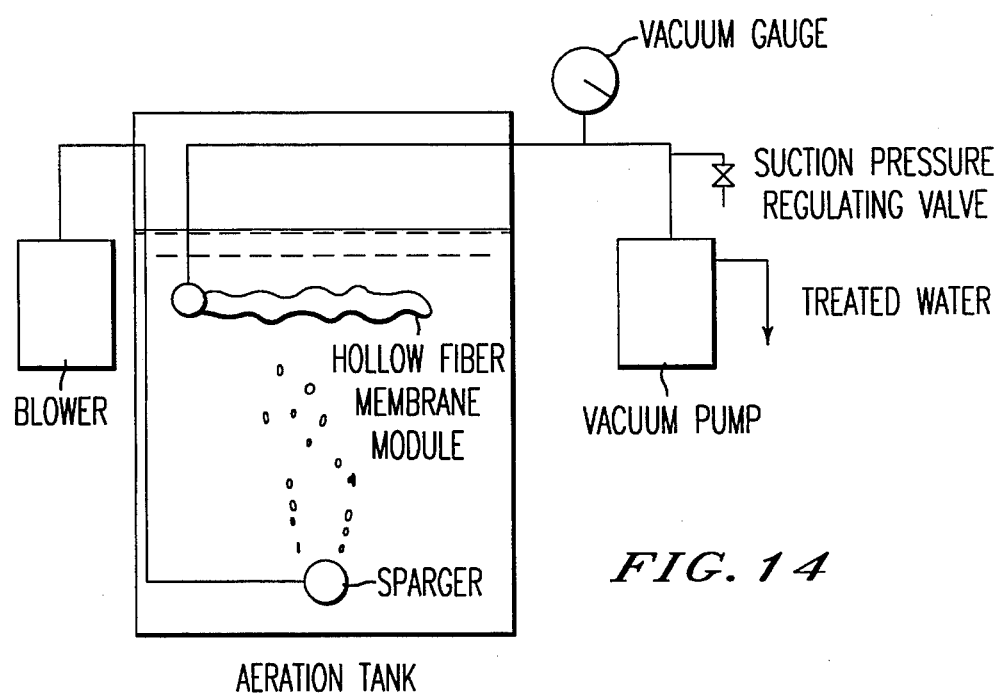
FIG. 14 is a diagram illustrating a flow system in which a hollow fiber membrane module in accordance with the present invention was used for the treatment of waste water.

Using this module, the treatment of waste water was carried out in a flow system illustrated in FIG. 14. The hollow fiber membrane module was operated under such conditions that the suction pressure was 0.2 kg/$cm^2$ and each suction cycle consisted of a 9-minute suction period and a 1-minute pause. The capacity of the aeration tank was 800 liters, the volumetric TOC load was 0.2 kg/$m^3$·day, and the MLSS content was about 5,000 ppm.

Figure 15:
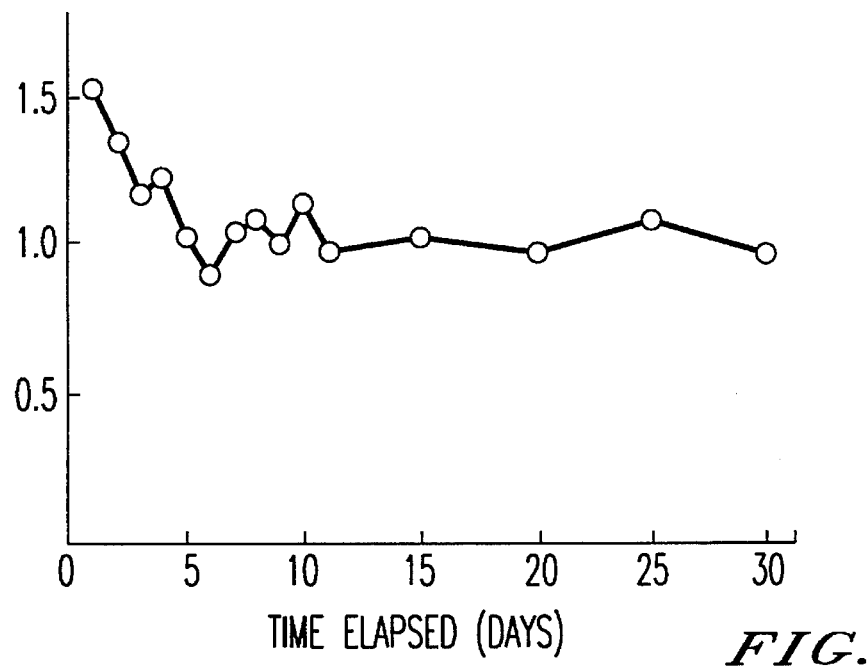
FIG. 15 is a graph showing the results of measurement of the filtering flow rate of the hollow fiber membrane module used for the treatment of waste water in the flow system of FIG. 14.

The treatment of waste water was continued for 30 days and changes in the filtering flow rate of the hollow fiber membrane module were measured. The results of measurement are shown in FIG. 15.

Comparative Example 1

Figure 16:
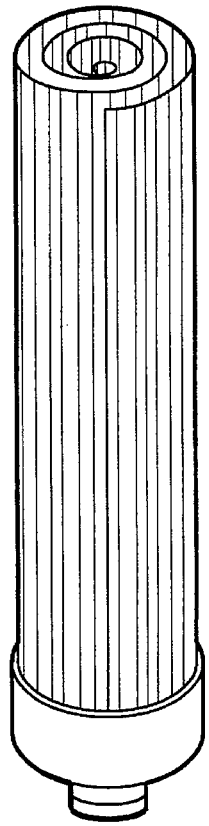
FIG. 16 is a perspective view illustrating the prior art cylindrical module used in Comparative Example 1.

A cylindrical module of the construction illustrated in FIG. 16 was fabricated by fixing the ends of porous polyethylene hollow fibers (commercially available from Mitsubishi Rayon Co., Ltd. under the trade name of EHF270T; having an inner diameter of 270 μm and an outer diameter of 380 μm) with a urethane resin. Each hollow fiber forming a loop had a length of 760 mm and a total effective filtering area of the module was 5 m².

The treatment of waste water was carried out in the same manner as in Example 1, except that the above-described cylindrical module was used. The results of measurement of the filtering flow rate of the hollow fiber membrane module are shown in FIG. 17.

Figure 17:
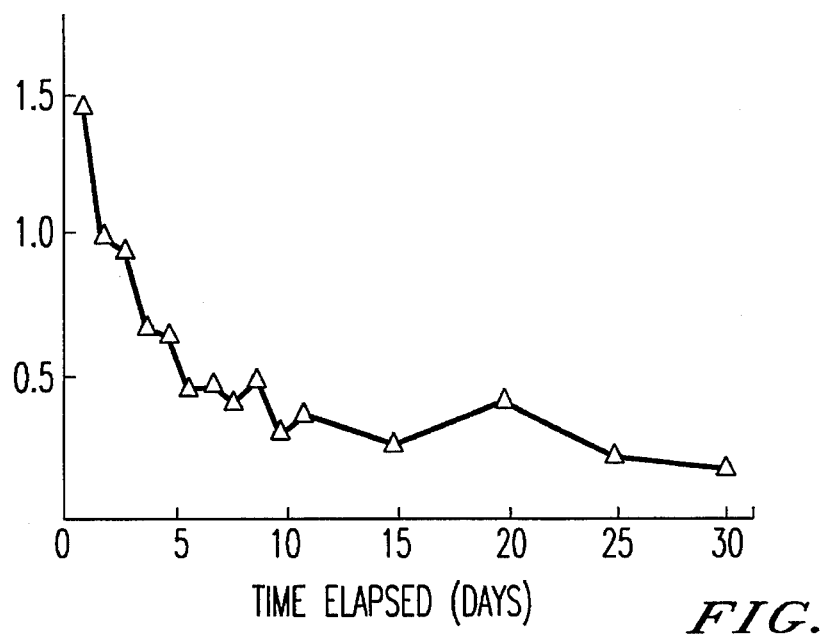
FIG. 17 is a graph showing the results of measurement of the filtering flow rate of the hollow fiber membrane module used in Comparative Example 1.

It is evident from a comparison of FIGS. 14 and 17 that, when used in the filtration of highly polluted water, the hollow fiber membrane module of the present invention can achieve a higher flow rate and a longer useful life than the cylindrical module.

EXAMPLE 2

Figure 18:
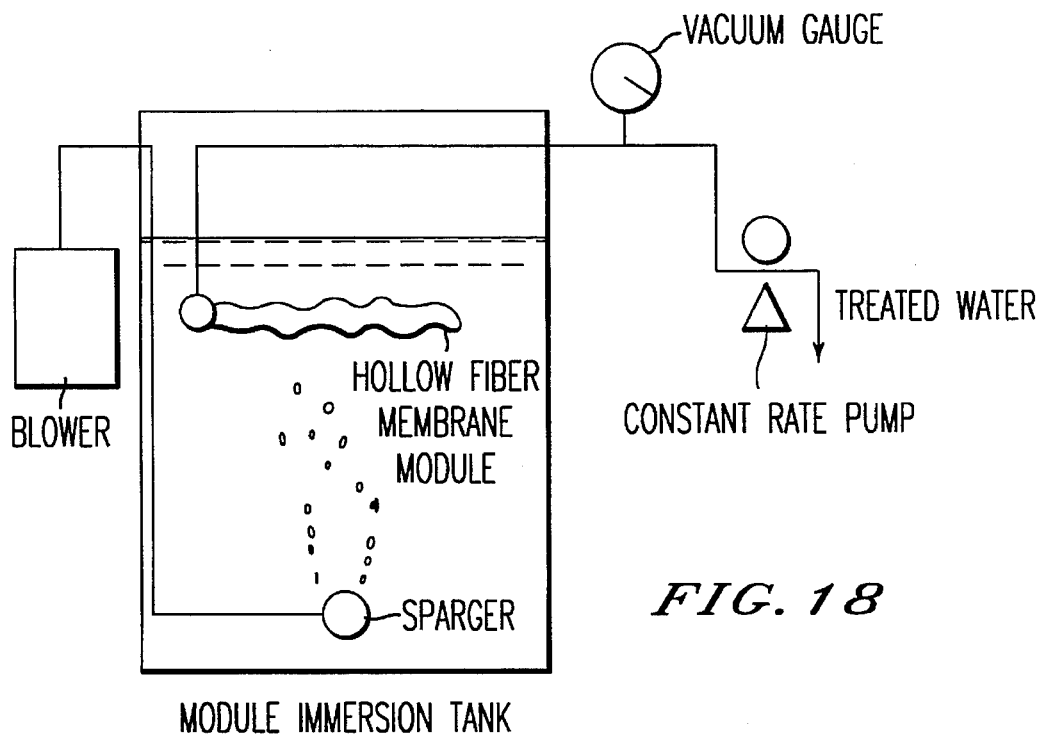
FIG. 18 is a diagram illustrating a flow system in which the test of Example 2 was carried out.

Porous polyethylene hollow fibers (commercially available from Mitsubishi Rayon Co., Ltd. under the trade name of EHF270T; having an inner diameter of 270 μm and an outer diameter of 380 μm) were permanently hydrophilized by coating their membrane surfaces with a saponification product of an ethylene-vinyl acetate copolymer. These hollow fibers were used to fabricated a hollow fiber membrane module similar to that of Example 1. Using this module, a filtration test was carried out in a flow system illustrated in FIG. 18. The fluid to be filtered comprised purified water having dry yeast suspended therein at a concentration of 200 ppm.

Filtration was carried out under such conditions that the LV was 0.01 meter per hour, each suction cycle consisted of a 5-minute suction period and a 5-minute pause, and the air bubbling rate was 35 normal liters per minute.

Comparative Example 2

Using a module similar to that of Example 2, filtration was carried out under the same conditions as described in Example 2, except that the air bubbling was omitted.

EXAMPLE 3

Using a module similar to that of Example 2, filtration was carried out under the same conditions as described in Example 2, except that the intermittent suction was replaced by continuous suction.

EXAMPLE 4

Using a knitted hollow fiber fabric similar to that of Example 2, a module of the construction illustrated in FIG. 6 was fabricated by fixing the opposite ends of the hollow fibers with a resin. This module had the same effective membrane area and effective hollow fiber length as that of Example 2. Using this module, filtration was carried out under the same conditions as described in Example 2.

EXAMPLE 5

Using a module similar to that of Example 1, filtration was carried out under the same conditions as described in Example 2.

The results obtained in the foregoing Examples 2–5 and Comparative Example 2 are shown in Table 1.

TABLE 1

|  | Suction pressure immediately after the start of operation (cmHg) | Suction pressure after 20 days (cmHg) |
| --- | --- | --- |
| Example 2 | 0.2 | 1.0 |
| Comparative Example 2 | 0.2 | 15.0 |
| Example 3 | 0.2 | 7.0 |
| Example 4 | 0.1 | 0.6 |
| Example 5 | 0.2 | 11.0 |

As is evident from Table 1, stable filtration can be carried out for a longer period of time by fabricating a module of permanently hydrophilized hollow fibers and operating it with a combination of intermittent suction and air bubbling cleaning. Moreover, modules having open ends on the opposite sides can be operated at lower suction pressures.

We claim:

1. A filtration method which comprises (A) immersing a hollow fiber membrane module in water to be treated, said hollow fiber membrane module comprising (a) hollow fibers, (b) a fastening member for fixing the ends of said hollow fibers while leaving said ends open, and (c) a structural member for enclosing and supporting said fastening member, said hollow fibers comprising a textile fabric containing hollow fibers as the weft, the cross-section of said fastening member perpendicular to said hollow fibers being in an elongated rectangular shape; and (B) filtering the water by suction from the surface to the inside of said hollow fibers with intermittent or continuous cleaning of the membrane surfaces of said hollow fibers.

2. A filtration method as claimed in claim 1 wherein the membrane surfaces are cleaned by air bubbling.

3. A filtration method as claimed in claim 1 wherein the filtration is carried out by intermittent suction in which the suction is interrupted at regular intervals.

* * * * *